(12) United States Patent
Nariyasu (10) Patent No.: US 6,237,946 B1
(45) Date of Patent: May 29, 2001

(54) INFLATABLE BELT DEVICE AND COMBINED INFLATABLE BELT AND TONGUE

(75) Inventor: Tsutomu Nariyasu, Shiga (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 09/348,040

(22) Filed: Jul. 6, 1999

(30) Foreign Application Priority Data

Jul. 6, 1998 (JP) .................................................. 10-190528

(51) Int. Cl.$^7$ .................................................. B60R 21/18
(52) U.S. Cl. ........................................ 280/733; 280/801.1
(58) Field of Search .................... 180/268; 280/730.1, 280/733, 736, 739, 801.1, 805, 729, 740; 297/468, 470, 471, 486, 482, 483

(56) References Cited

U.S. PATENT DOCUMENTS

| | | | |
|---|---|---|---|
| 3,791,670 | 2/1974 | Lucore et al. | 280/150 AB |
| 3,801,156 | * 4/1974 | Granig | 297/471 |
| 3,868,627 | 2/1975 | Lawwill | 340/52 E |
| 3,874,694 | 4/1975 | Stephenson | 280/150 AB |
| 3,877,719 | 4/1975 | Lewis et al. | 280/150 AB |
| 5,346,250 | * 9/1994 | Kamiyama | 280/733 |
| 5,393,091 | * 2/1995 | Tanaka et al. | 280/733 |
| 5,445,411 | * 8/1995 | Kamiyama et al. | 280/733 |
| 5,466,002 | * 11/1995 | Tanaka et al. | 280/733 |
| 5,597,178 | * 1/1997 | Hardin, Jr. | 280/733 |
| 5,765,869 | 6/1998 | Huber | 280/807 |
| 5,788,282 | * 8/1998 | Lewis | 297/483 |
| 6,019,388 | * 2/2000 | Okazaki et al. | 280/733 |
| 6,062,597 | * 5/2000 | Suyama | 280/733 |
| 6,082,763 | * 7/2000 | Kokeguchi | 280/733 |

* cited by examiner

Primary Examiner—J. J. Swann
Assistant Examiner—Christopher Bottorff
(74) Attorney, Agent, or Firm—Foley & Lardner (57) ABSTRACT

In order to reduce the thickness of a connecting portion of an inflatable belt and a tongue, a gas introduction pipe is held by a pipe holder disposed at a side of a tongue. A narrow portion at the end of the inflatable belt is passed through an opening of the tongue, folded at the opening to be superposed on and sewn together with a wide portion of the inflatable belt. The rear end of the pipe is inserted into an insertion hole of the inflatable belt. The pipe has an exhaust pipe branched therefrom. Gas from an inflator is supplied into the inflatable belt through the pipe. As the weight of an occupant is applied on to the inflated inflatable belt, gas within the inflatable belt is discharged through the exhaust pipe, thereby absorbing the impact. Caps are put on ends of the pipes, respectively, to prevent foreign matter from entering the pipe assembly.

23 Claims, 15 Drawing Sheets

Prior Art

INFLATABLE BELT DEVICE AND COMBINED INFLATABLE BELT AND TONGUE

BACKGROUND OF THE INVENTION

1. Field of the Invention

The present invention relates to a device for protecting an occupant in a vehicle such as an automobile during a vehicle collision and, more particularly, to combination of an inflatable belt capable of being inflated with gas from a gas generator, and a tongue. The present invention further relates to an inflatable belt device including the combination.

2. Description of Related Art

Figure 8:
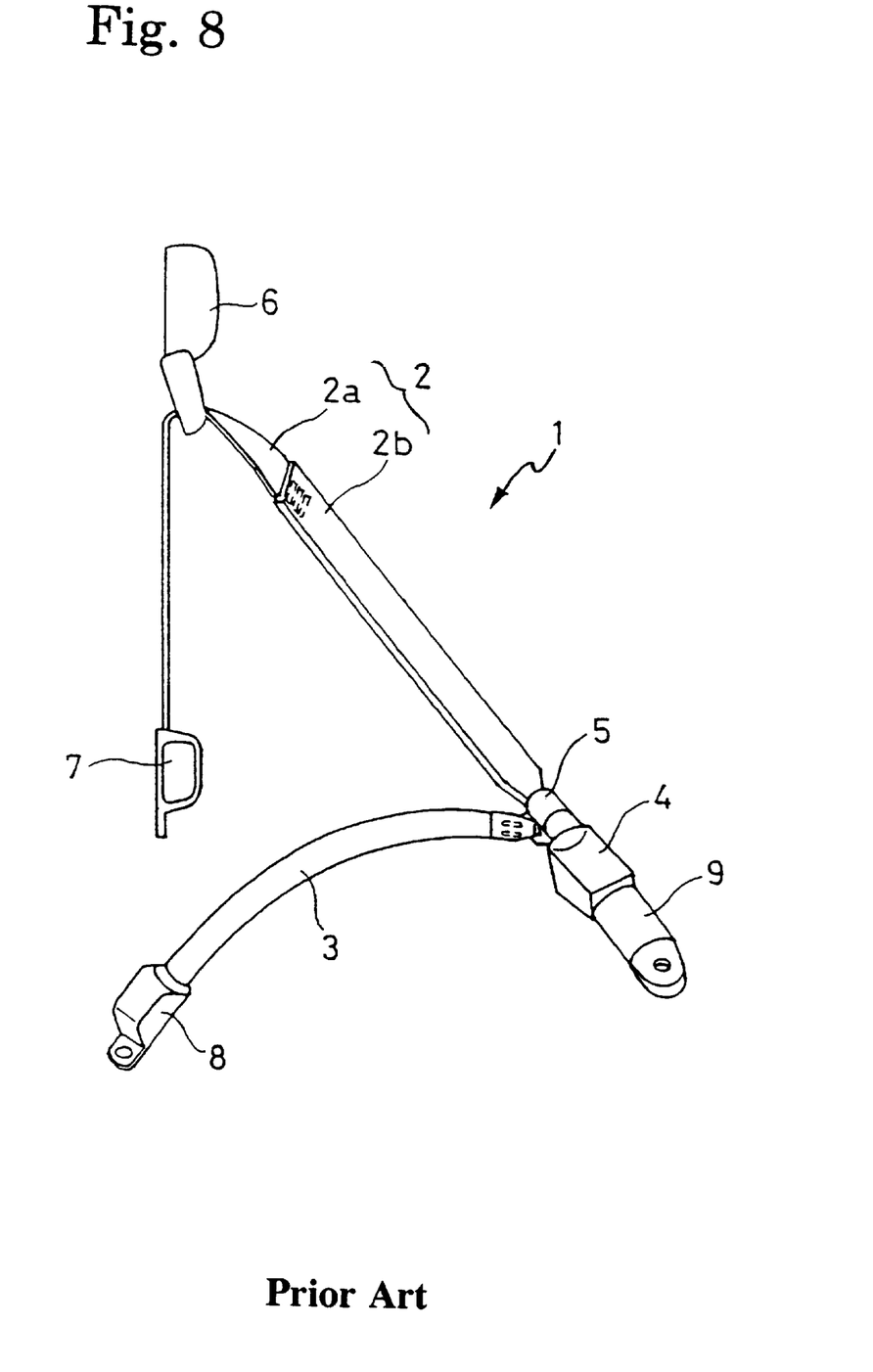
FIG. 8 is a perspective view of the inflatable belt device disclosed in Japanese patent publication 5-85301.

An inflatable belt device of this type is disclosed in Japanese Unexamined Patent Publication H05-85301 and is shown in FIG. 8. This passenger protective device 1 includes a shoulder belt 2 extending diagonally from the right side to the left side of a passenger, a lap belt 3 extending from the right side to the left side of the passenger, a buckle 4 fixed to, for example, a vehicle floor, a tongue 5 to be inserted into and engaged with the buckle 4 when the passenger wears the belt, and an intermediate guide 6 for guiding the shoulder belt 2.

The shoulder belt 2 includes a webbing 2a, which is the same as a typical conventional seat belt, and an inflatable belt 2b connected to an end of the webbing 2a. The webbing 2a is slidably hung in the intermediate guide 6. The other end of the webbing 2a is connected to a shoulder belt retractor 7 with an emergency locking mechanism (ELR), which is fixed to the vehicle body. The webbing 2a is arranged such that it is wound into the shoulder belt retractor 7.

The inflatable belt 2b is positioned so that it contacts the passenger and is connected to the tongue 5 at an end opposite to the end connected to the webbing 2a. The lap belt 3 is composed of a webbing, which is the same as a typical conventional seat belt, having one end is connected to the tongue 5 and the other end connected to a lap belt retractor 8 (ELR), which is fixed to the vehicle body. A gas generator 9 is connected to the buckle 4. The gas generator 9 is actuated in emergency situations, e.g., vehicle collisions, to generate high-pressure gas. The tongue 5 and the buckle 4 are each provided with passages for introducing gas from the gas generator 9 into the inflatable belt 2b. When the gas generator 9 is actuated, the gas is introduced into the inflatable belt 2b through this passages so that the inflatable belt 2b is inflated.

The tongue 5 disclosed in Japanese publication 5-85301, which allows gas to be introduced therethrough, is cylindrical and stumpy. This shape makes the tongue 5 conspicuous especially when the tongue 5 is hung to extend along the center pillar, thereby spoiling the beauty of a vehicle cabin.

SUMMARY OF THE INVENTION

Accordingly, it is a general object of the invention to provide an inflatable belt that will obviate or minimize the above difficulties.

It is a specific object of the present invention to provide an inflatable belt device having a flat-shaped tongue.

A preferred embodiment, which is intended to accomplish at least some of the above objects, includes a tongue having an opening at a rear portion; an inflatable belt connected to the rear portion of the tongue and into which a gas is introduced; and a gas introduction pipe connected to the tongue, wherein a rear end portion of the gas introduction pipe is disposed inside the inflatable belt and a front end portion is disposed outside of the inflatable belt.

Additional objects and advantages of the invention will be set forth in the following description of the preferred embodiments and, in part, will be obvious from the description or through practicing the invention. The objects and advantages may be realized through the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the above general description and the following detailed description, serves to explain the principles of the invention.

FIGS. 7a and 7b show the structure of an inflatable belt device according to an embodiment, in which

FIGS. 11a–11c show a combination of an inflatable belt and a tongue according to still another embodiment, in which FIG. 11c is a plan view.

FIG. 14a is an exploded perspective view showing a combination according to still another embodiment and FIG. 14b is a partially sectional view of the pipe assembly shown in FIG. 14a; and FIGS. 15a and 15b show the combination of FIG. 14a, in which FIG. 15a is a perspective view and FIG. 15b is a sectional view taken along a line XVb—XVb in FIG. 15a.

DETAILED DESCRIPTION OF PREFERRED EMBODIMENTS

A safety belt of one embodiment of the present invention includes an inflatable belt into which gas is introduced, and a tongue to which an end of the inflatable belt is connected. A rear portion of the tongue has an opening through which an end of the inflatable belt is inserted. After the end of the inflatable belt has been passed through the opening, the end is folded back and sewn to the inflatable belt to securely fasten the tongue to the inflatable belt with very high strength. The tongue has a gas introduction pipe of which a rear end portion is disposed inside the inflatable belt and a front-end portion is disposed outside of the inflatable belt. As a result of this combination, the tongue can be made to be thin like a plate.

According to an aspect of the present invention, the gas introduction pipe is separate from the tongue and the pipe is held, e.g. clamped, by a pipe holder disposed on the tongue. The pipe holder may be of a cantilever type, for example, having a C-like configuration.

According to another aspect of the present invention, an attachment plate is integrally formed to the pipe assembly to form a monolithic unit. The attachment plate is fixed to the tongue. In yet another aspect of the present invention, a holder assembly is connected to the tongue. The assembly has a lap belt anchor and a pipe assembly having the pipe and the attachment plate.

The pipe may extend along a side of the tongue to the rear of the tongue.

The combination may include an exhaust pipe for discharging gas from the inflatable belt when the weight of an occupant is applied to the inflated inflatable belt, thereby absorbing the impact. The exhaust pipe may be branched from the gas introduction pipe.

The pipe and the exhaust pipe may be provided with closing members at the respective ends thereof so as to prevent the ingress of objects (for example, sand, dirt and liquid) into the pipe and the exhaust pipe. The closing member may be a cap for example.

Referring now to the Figures, and, in particular, to FIGS. 1 through 4, there will be seen a tongue 10 formed in a plate-like shape. The tongue 10 has a latch hole 12 formed in a front end portion and an opening 14 formed in a rear end portion. The opening 14 allows the inflatable belt 20 to be passed through the tongue 10. The inflatable belt 20 preferably includes a bag 22 and a mesh webbing 24 enclosing the bag 22.

Figure 1A:
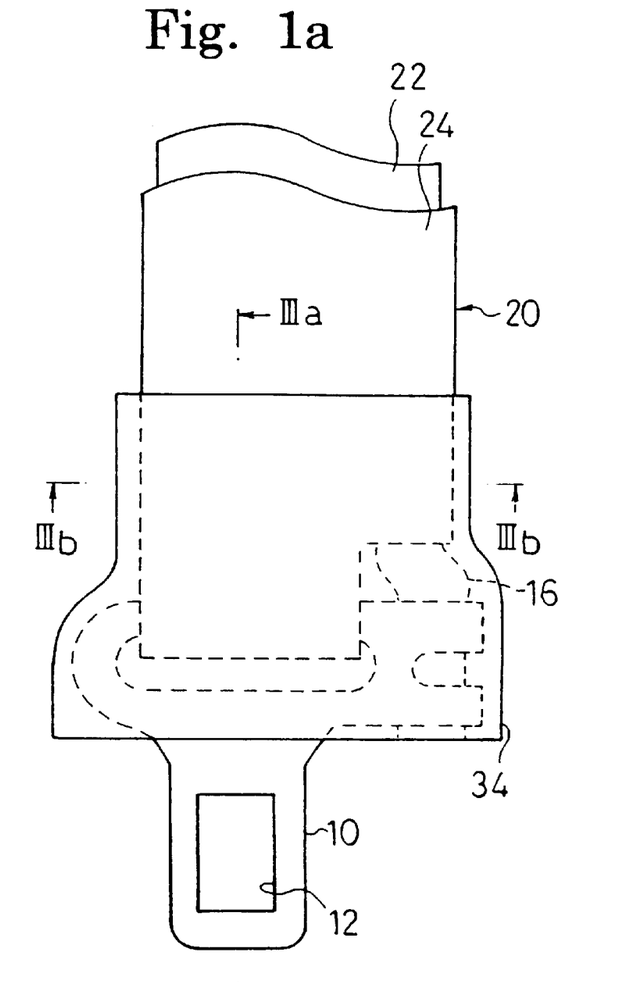
FIGS. 1a–1c are structural views showing a combination of an inflatable air belt and a tongue according to one embodiment of the present invention.
Figure 1B:
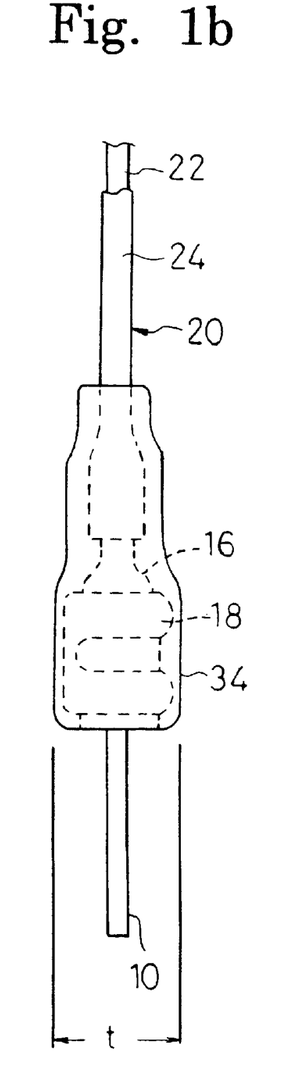
Figure 1C:
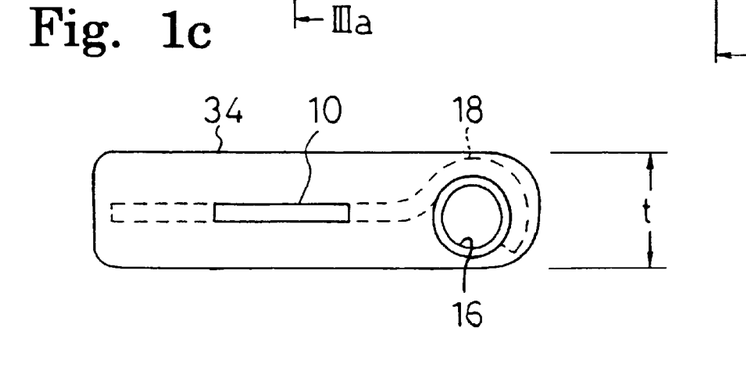
Figure 2A:
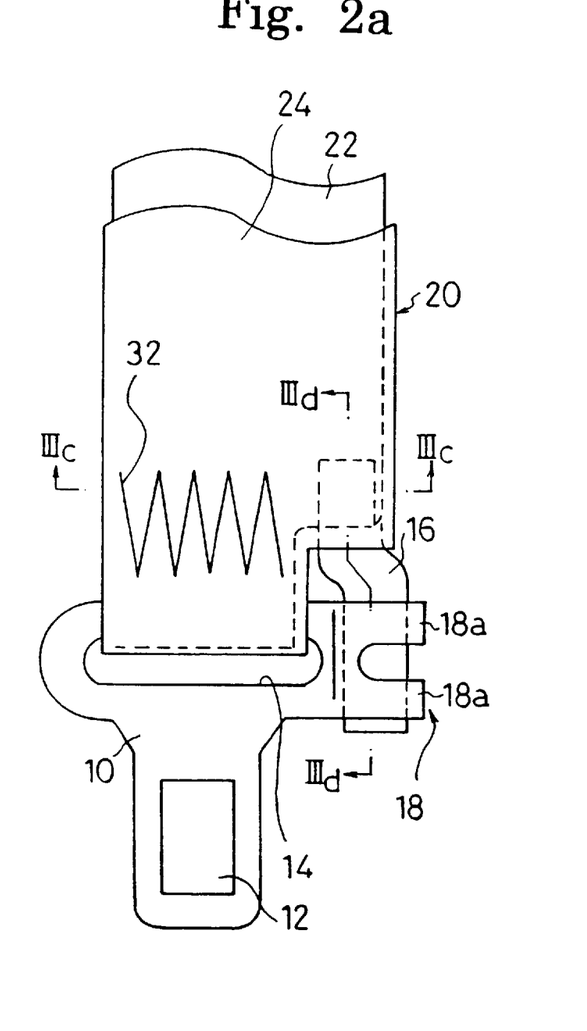
FIGS. 2a–2c are structural views of the combination of FIG. 1 with the cover mold omitted.
Figure 2B:
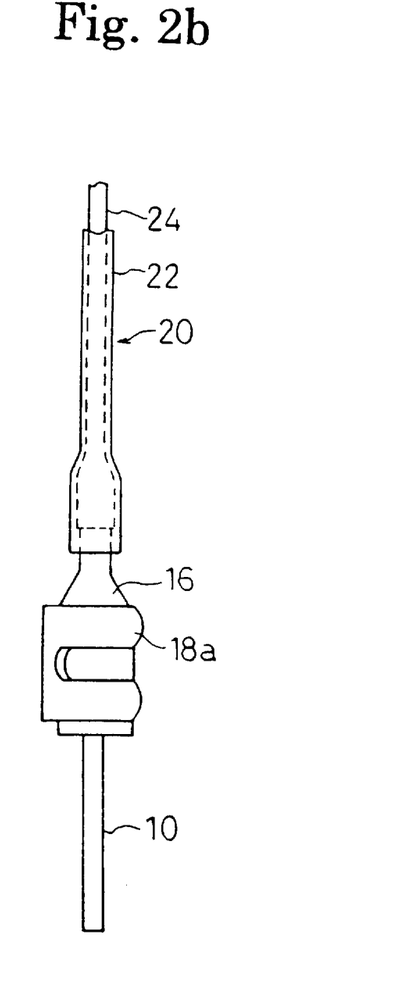
Figure 2C:
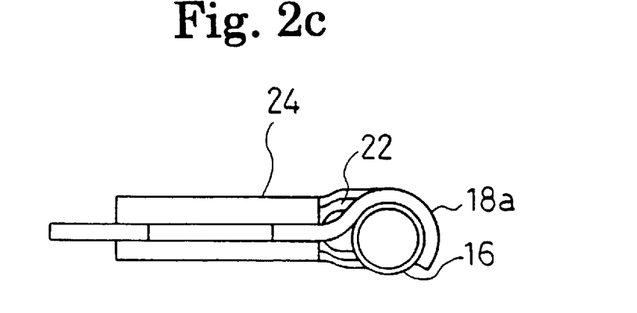
Figure 3A:
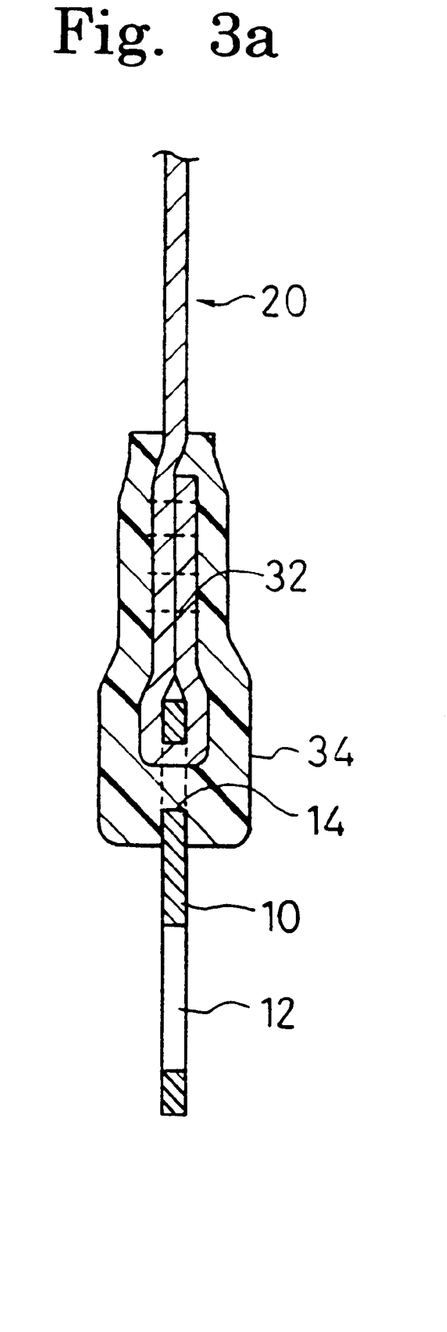
FIGS. 3a–3d are sectional views showing the structure of the combination shown in FIGS. 1a through 2c.
Figures 3B, 3C:
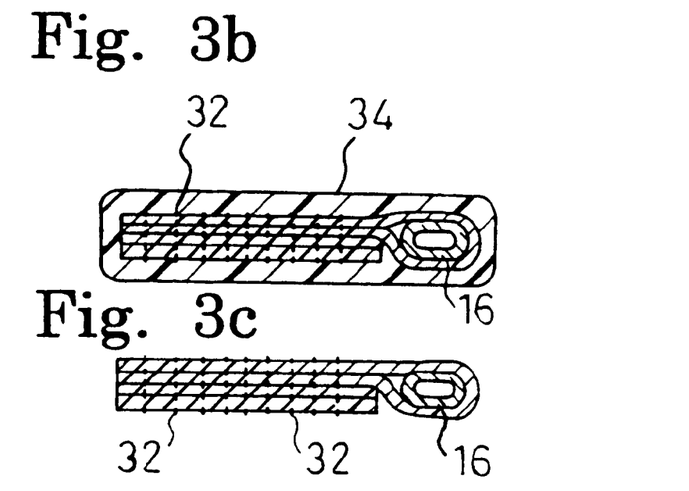
Figure 3D:
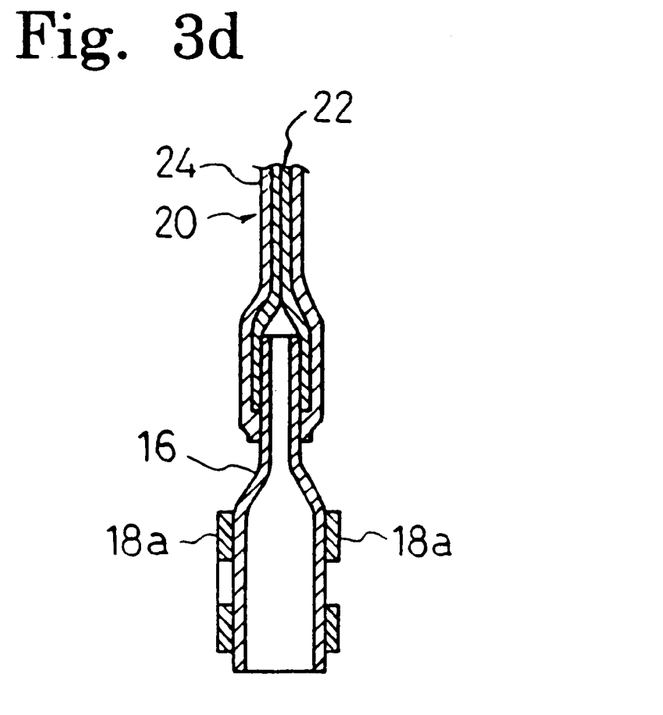
Figure 4:
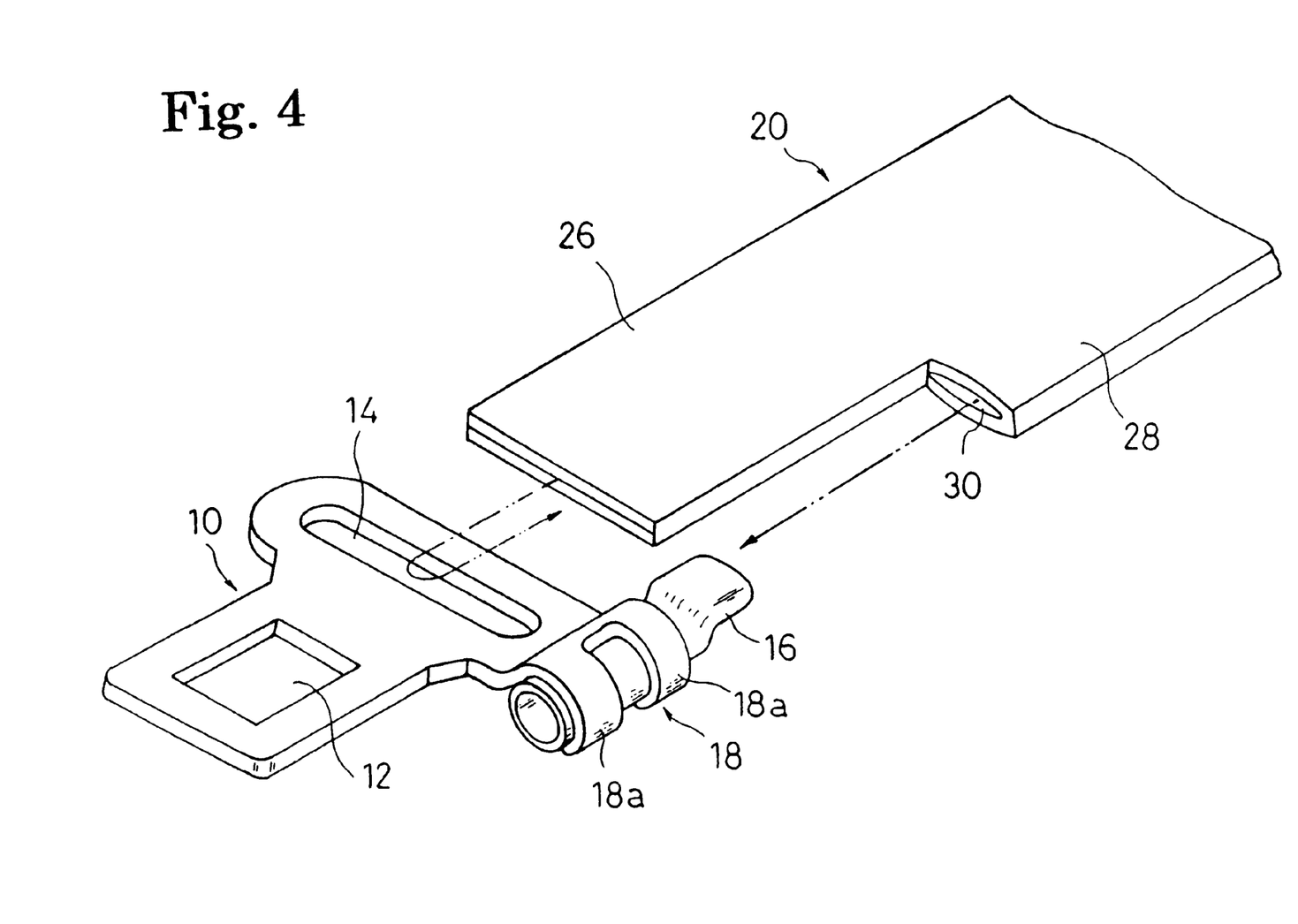
FIG. 4 is an exploded perspective view showing the structure of the combination shown in FIGS. 1a through 3d.

The bag 22 is made of a material that prevents gases from permeating through (e.g. fabric coated with resin) and is formed in a long envelope-like configuration. The bag 22 is folded in a long band-like configuration.

The mesh webbing 24 encloses the folded band-like bag 22. The mesh webbing 24 preferably includes a knit member which is hard to stretch in the longitudinal direction, but is supple and stretchable in the width direction or the inflating direction.

As shown in FIG. 4, the inflatable belt 20 includes a wide portion 28 and a narrow portion 26 at an end side. The narrow portion 26 is passed through the opening 14. The boundary between the narrow portion 26 and the wide portion 28 is formed like a step that extends in the width direction of the inflatable belt 20. The inflatable belt 20 has an insertion hole 30 for a pipe 16 at the step-like portion.

A side portion of the tongue 10 is provided with a pipe holder 18 for the pipe 16. The pipe holder 18 preferably has claws 18a formed in a C-like configuration. The pipe 16 spreads the claws 18a when it is placed in the pipe holder 18. The pipe 16 has a cylindrical front portion which is held by the pipe holder 18. The rear portion of the pipe 16 is formed in a flat columnar shape.

To connect the inflatable belt 20 to the tongue 10, the narrow portion 26 is passed through the opening 14. During this, the rear end of the pipe 16 is inserted into the insertion hole 30. Then, the narrow portion 26 is folded back at the opening 14, superposed onto the wide portion 28, and then sewn to the wide portion 28 with a sewing yarn. Numeral 32 designates stitches with the sewing yarn. After that, a cover mold 34 is molded by a synthetic resin to cover a portion including a rear portion of the tongue 10 and the end of the inflatable belt 20. It should be noted that a previously molded cover may be used rather than molding the cover mold 34 to the tongue 10 and inflatable belt 20.

In this configuration, to connect the inflatable belt 20 and the tongue 10, the pipe 16 is arranged at the side portion of the tongue 10, and the inflatable belt 20 and the tongue 10 are connected to each other by passing the narrow portion 26 of the inflatable belt 20 through the opening 14, folding back at the opening 14, and sewing the narrow portion 26 and the wide portion 28 together. Therefore, the connecting portion of the inflatable belt 20 and the tongue 10 can have quite a small thickness t.

Figure 5A:
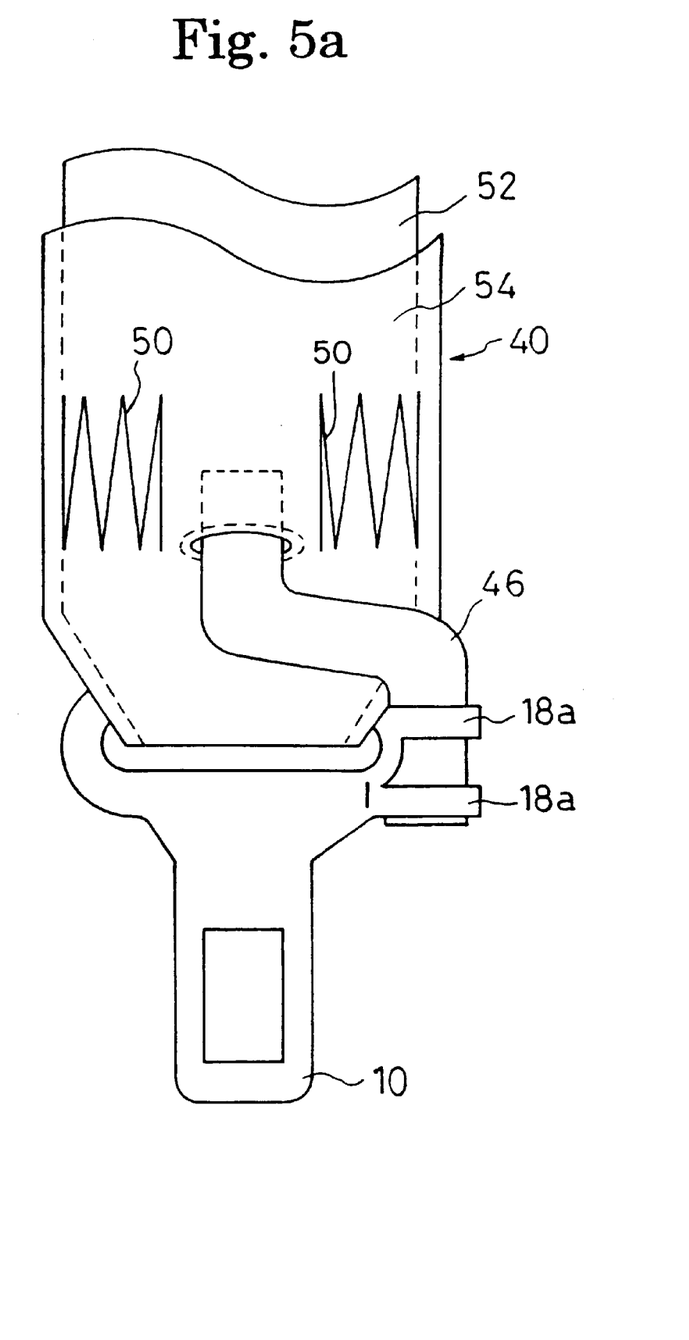
FIGS. 5a and 5b are structural views showing a combination of an inflatable air belt and a tongue according to another embodiment.
Figure 5B:
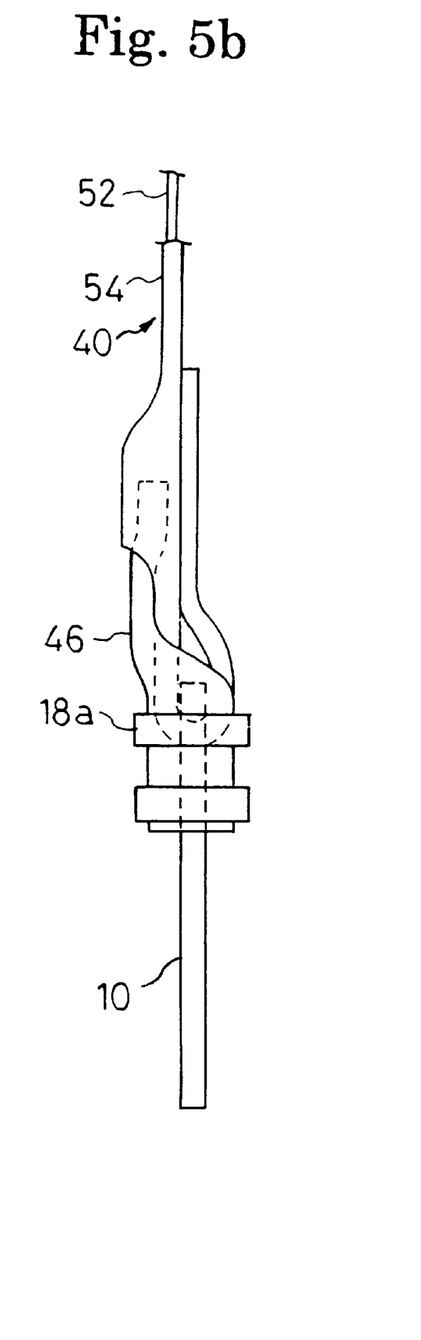
Figure 6:
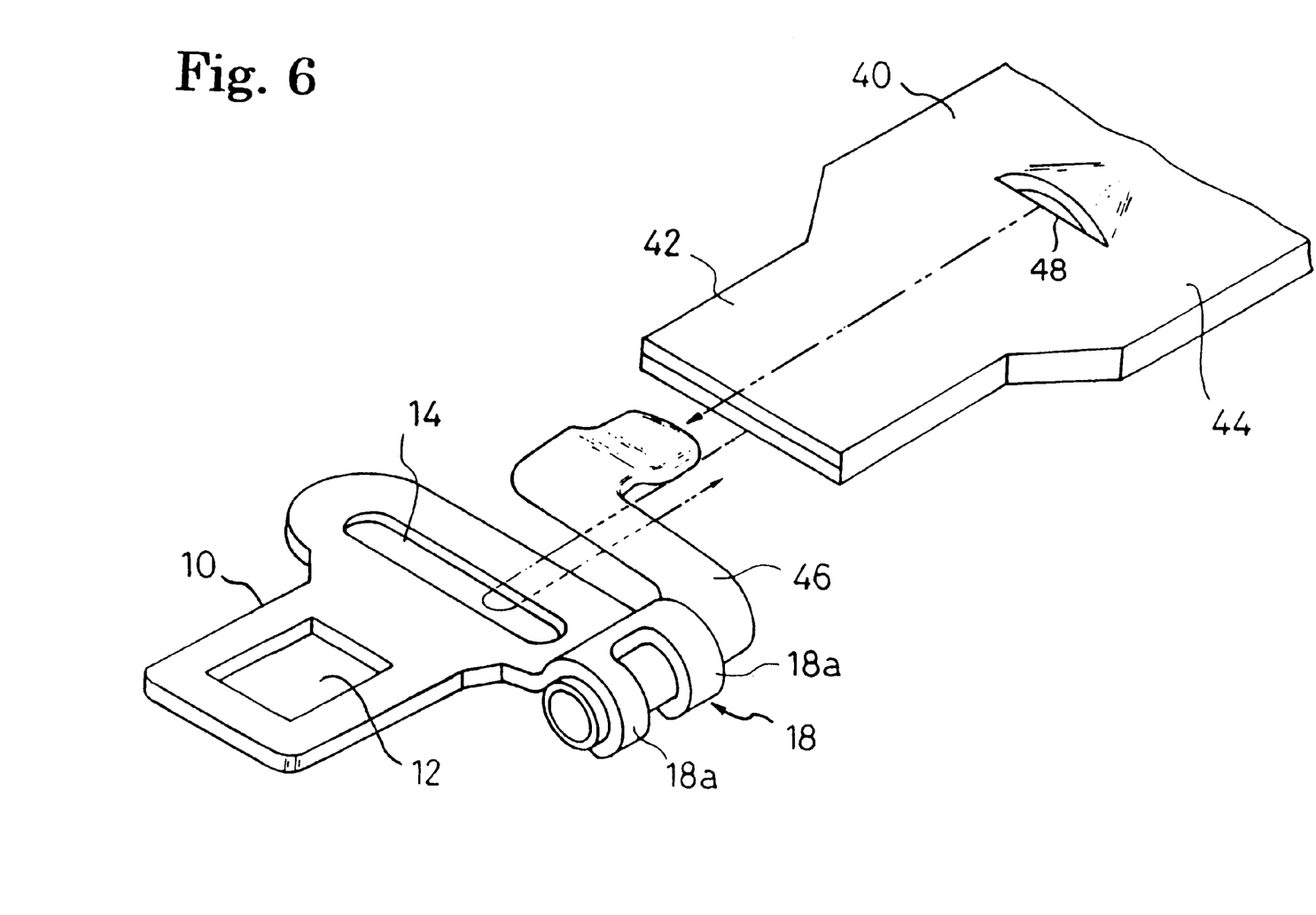
FIG. 6 is an exploded perspective view showing the structure of the combination shown in FIGS. 5a and 5b.

Another embodiment is shown in FIGS. 5a, 5b and 6, in which a narrow portion 42 at the end of an inflatable belt 40 is passed through an opening 14 of a tongue 10. During this, the end of a pipe 46 is inserted into an insertion hole 48 of the wide portion 44. The narrow portion 42 of the inflatable belt 40 is folded back at the opening 14 and is superposed onto a wide portion 44 the inflatable belt 40. Then, they are sewn together. Numeral 50 in FIG. 6a designates stitches for this sewing.

Also in this embodiment, the inflatable belt 40 preferably includes a bag 52 and a mesh webbing 54 enclosing the bag 52.

According to this embodiment, an insertion hole 48 is formed at an approximate middle of the width of the inflatable belt 40. A pipe 46 having a bent portion extending to approximately the middle of the width direction of the tongue 10 is inserted into the insertion hole 48. The pipe 46 preferably also has a cylindrical portion which is held by a pipe holder 18 of a tongue 10. The rear portion of the pipe 46, other than the cylindrical portion, is formed in a flat columnar shape.

In the combination of the inflatable belt 40 and the tongue 10 shown in FIGS. 5a, 5b, and 6, the pipe 46 is arranged at the side portion of the tongue 10, and the combined unit is constructed by passing the narrow portion 42 of the inflatable belt 40 through the opening 14, folding back the narrow portion 42 at the opening 14, and sewing the narrow portion 42 and the wide portion 44 together. Therefore, the combination can have small thickness.

Hereinafter, a description will be made regarding the structure of an inflatable belt device employing the combination of the inflatable belt 20 or 40 and the tongue 10 with reference to FIGS. 7a and 7b. The tongue is inserted into a tongue insertion slot 62 of a buckle 60 so that the latch hole 12 is latched with a latch pawl of a latching mechanism (not shown) in the buckle 60. By pressing a press button 64 disposed on the buckle 60, the latching can be cancelled and the tongue 10 is ejected from the buckle 60 by a spring (not shown).

Gas from an inflator 66 attached to the buckle 60 can be emitted through a gas outlet 68 at the end of the buckle 60. As shown in FIG. 7b, when the tongue 10 is engaged with the buckle 60, the gas outlet 68 confronts an inlet of the pipe 16 or 46. There is a bracket 70 projecting downward from the buckle 60. The bracket 70 has a bolt hole 72 formed therein, through which a bolt is inserted so as to fix the buckle 60 to a member of the vehicle body (not shown).

In the inflatable belt device structured as mentioned above, before the inflator 66 is actuated, the inflatable belt 20 or 40 is maintained in a flat band-like configuration.

Figures 7A, 7B:
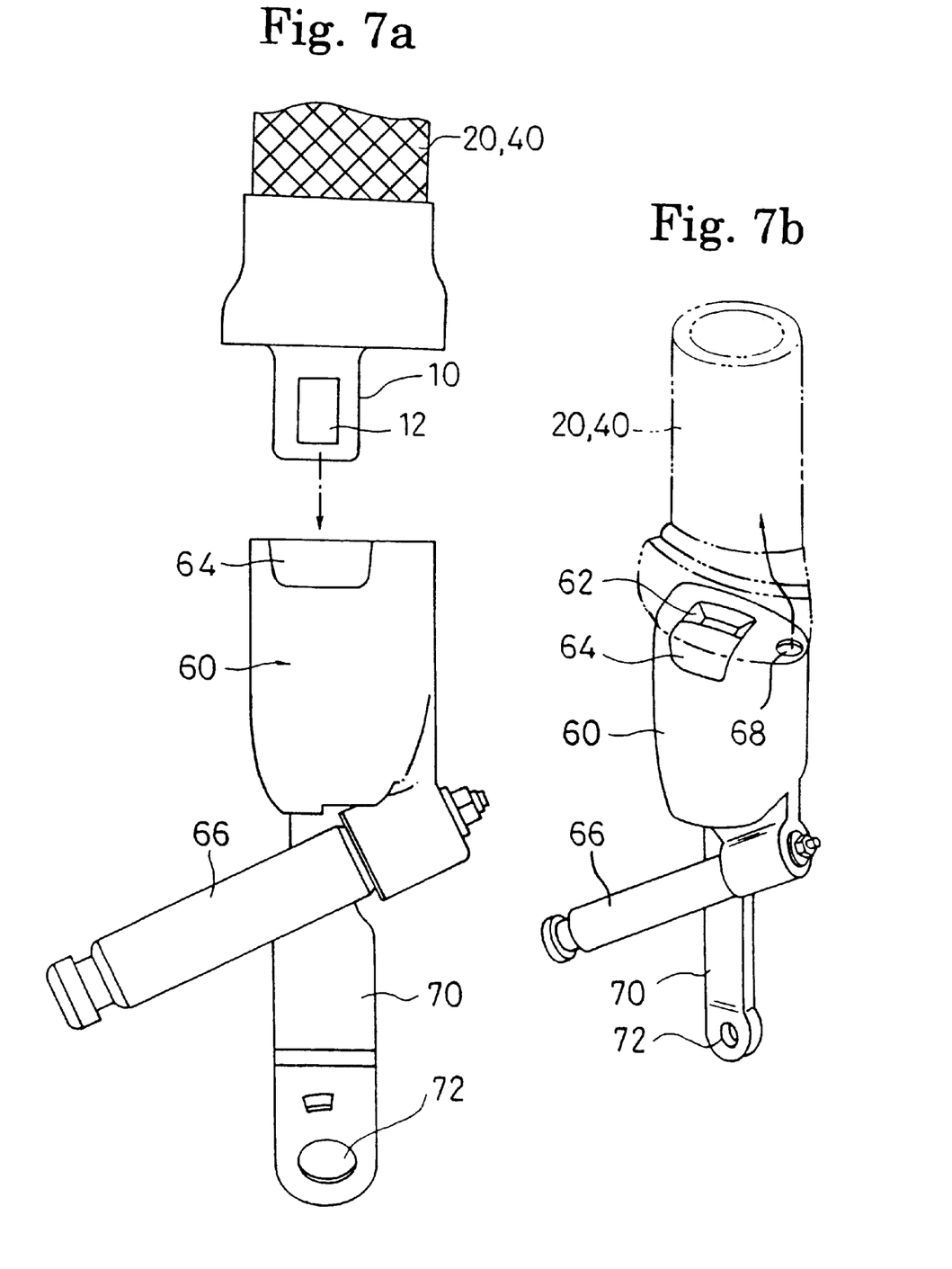
FIG. 7a is a view demonstrating the state just before a tongue is inserted into a buckle and FIG. 7b is a perspective view of the inflatable belt device with the tongue and buckle engaged.

When an occupant wears the inflatable belt device, the tongue 10 is inserted into the buckle 60 as shown in FIG. 7b so that the gas outlet 68 confronts the gas inlet of the pipe 16 or 46. When the tongue is engaged and the inflator (gas generator) 66 is actuated due to a vehicle collision or rollover, gas is introduced into the inflatable belt 20 or 40 through the pipe 16 or 46, thereby inflating the inflatable belt 20 or 40.

Figure 9:
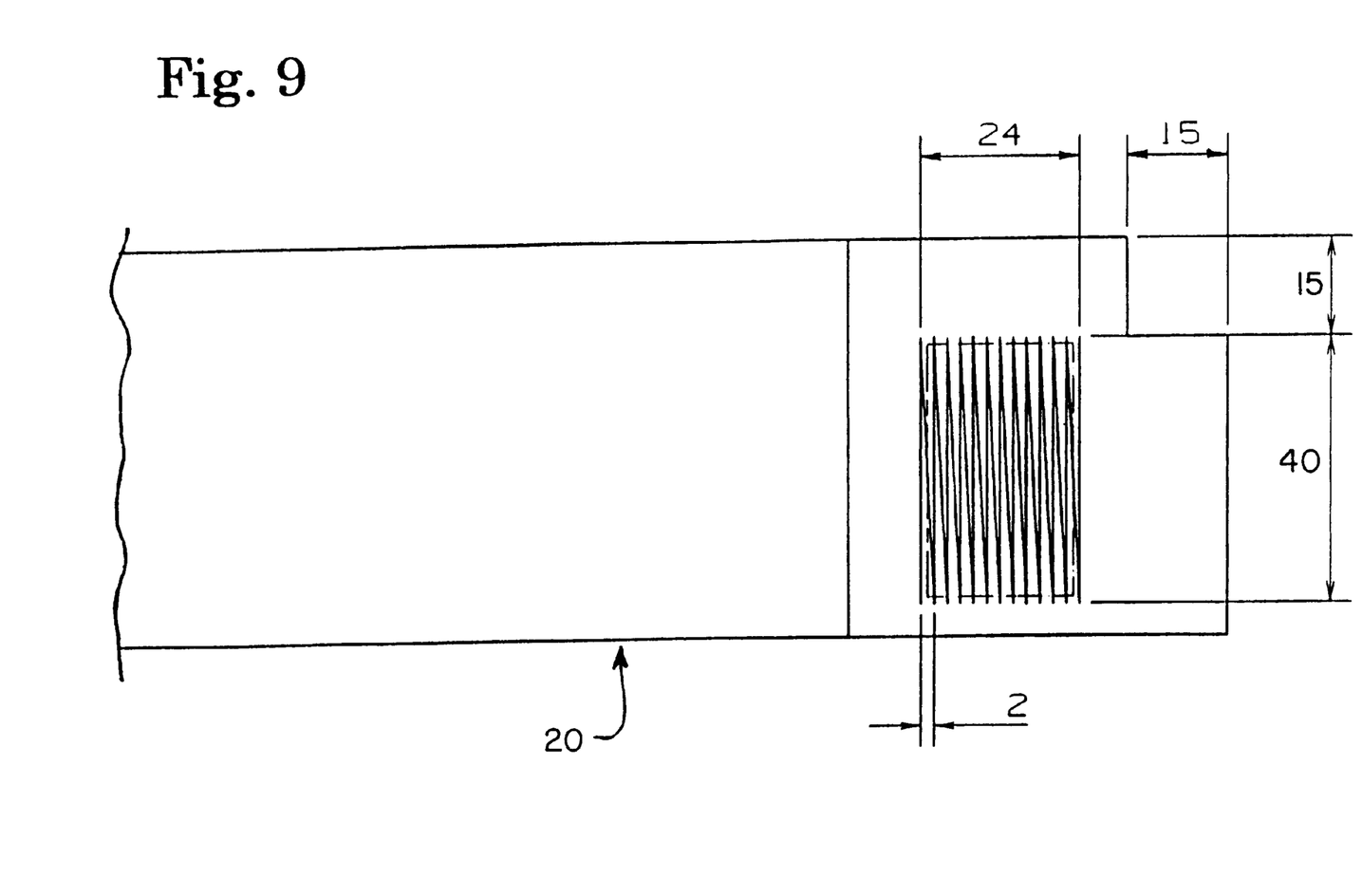
FIG. 9 is a view for explaining a connecting portion between an inflatable belt and a tongue.
Figure 10:
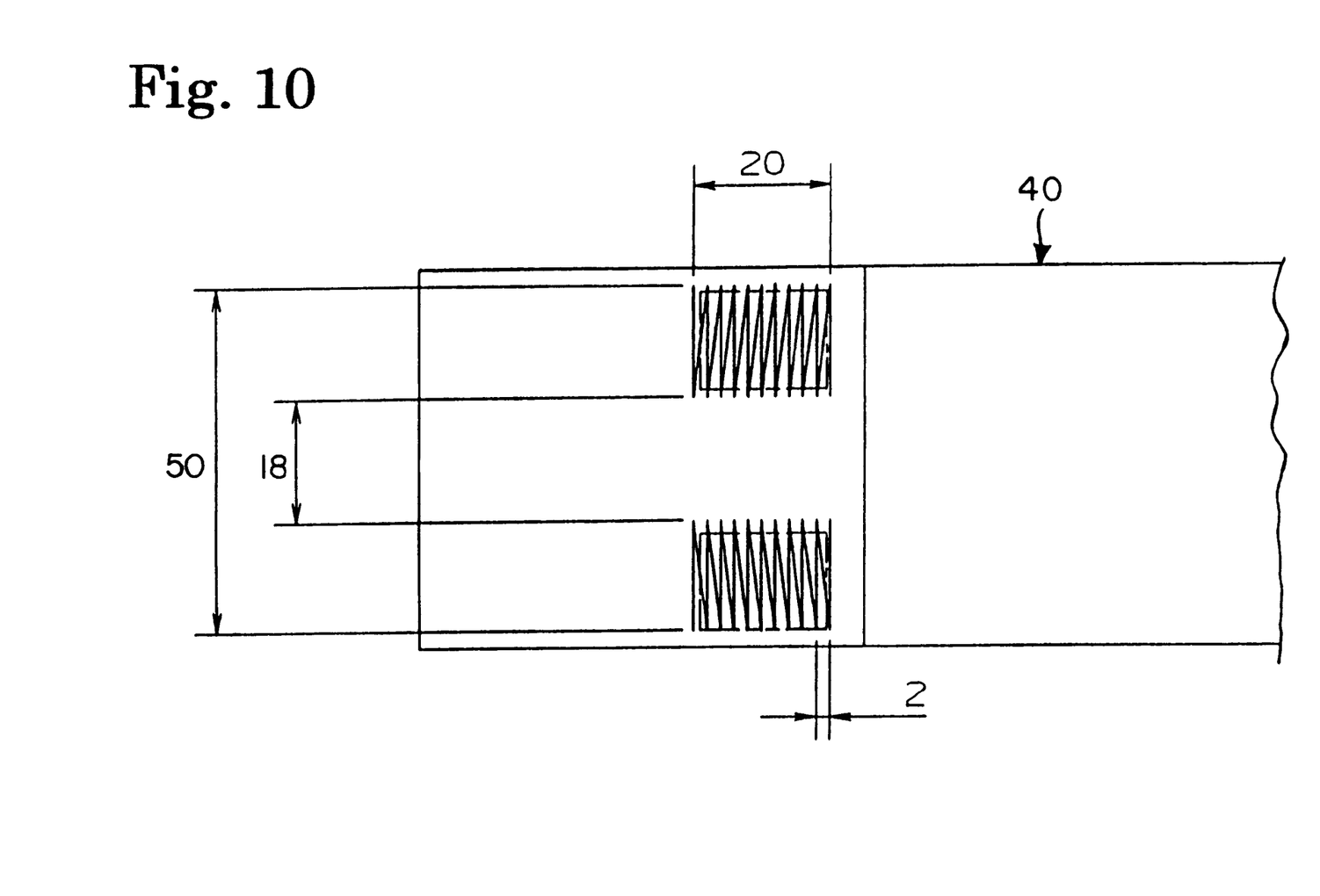
FIG. 10 is a view for explaining a connecting portion between an inflatable belt and a tongue.

FIGS. 9 and 10 show preferred embodiments of stitching at the connecting portion between the inflatable belt and the tongue. The embodiment shown in FIG. 9 is a preferable stitching example for the embodiments of FIGS. 1a through 4. Stitching lines extend in the width direction of the inflatable belt. The area of the stitched portion is 960 mm$^2$ (24 mm×40 mm), the pitch of the stitches is 3 mm, the pitch between the adjacent stitching lines is 2 mm, and the number of the stitches is about 333.

The embodiment shown in FIG. 10 is a preferable stitching example for the embodiments of FIGS. 5a through 6. Stitching lines extend in the width direction of the inflatable belt. The area of the stitched portion is 560 mm$^2$ ((20 mm×16 mm)×2), the pitch of the stitches is 3 mm, the pitch between the adjacent stitching lines is 2 mm, and the number of the stitches is about 224.

FIGS. 11a through 15b show embodiments in which the pipes are able to exhaust gas from the inflatable belt.

Figure 11A:
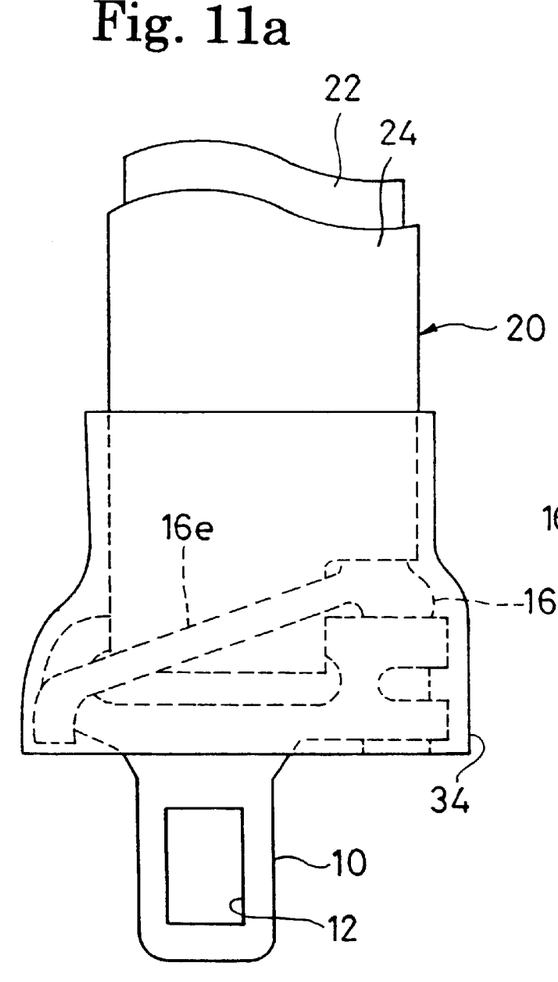
Figure 11B:
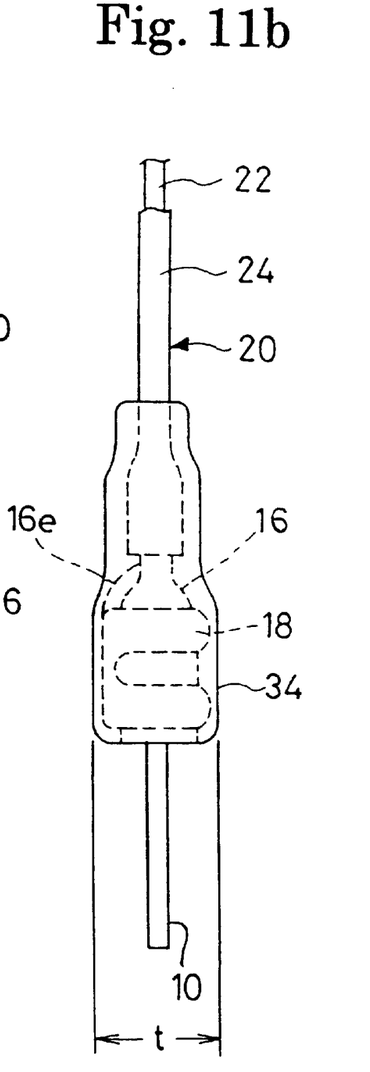
FIG. 11b is a side view.
Figure 11C:
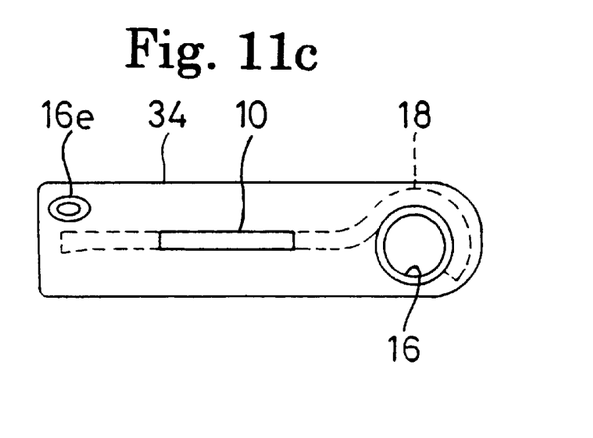
FIG. 11c is a front view.
Figure 12:
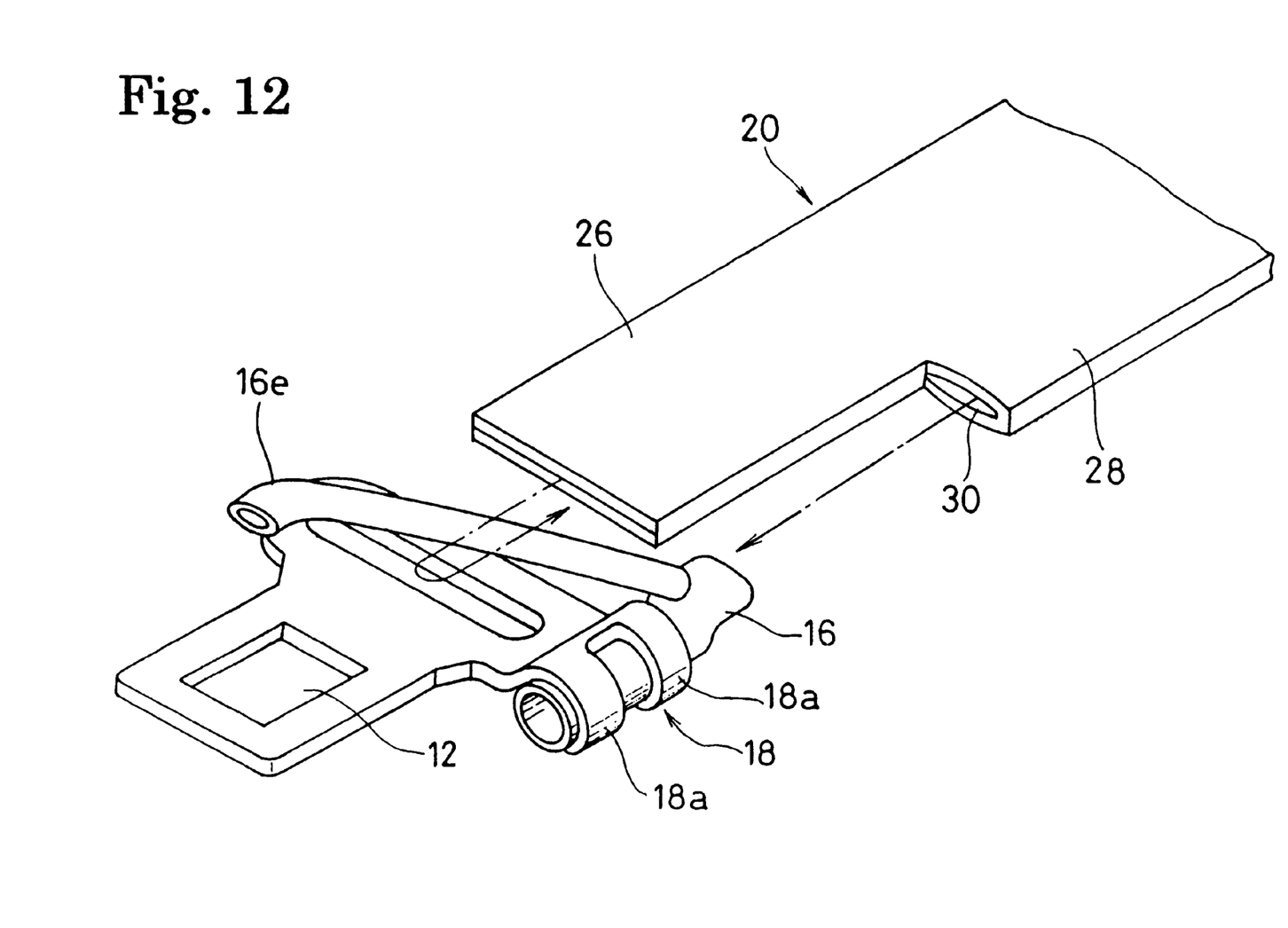
FIG. 12 is an exploded perspective view showing the combination shown in FIGS. 11a, 11b and 11c.

The embodiment shown in FIGS. 11a through 12 is based on the embodiment of FIGS. 1a through 4. The pipe 16 includes an exhaust pipe 16e, which branches from the pipe 16. The exhaust pipe 16e is disposed in such a manner that its end is placed at the end surface of the cover mold 34. The end of the exhaust pipe 16e is positioned at a side of the tongue 10 opposite to the side where the gas inlet of the pipe 16 is disposed. The other structures of FIGS. 11a through 12 are the same as those of the embodiment of FIGS. 1a through 4 and the same numerals designate the same parts.

Figure 13:
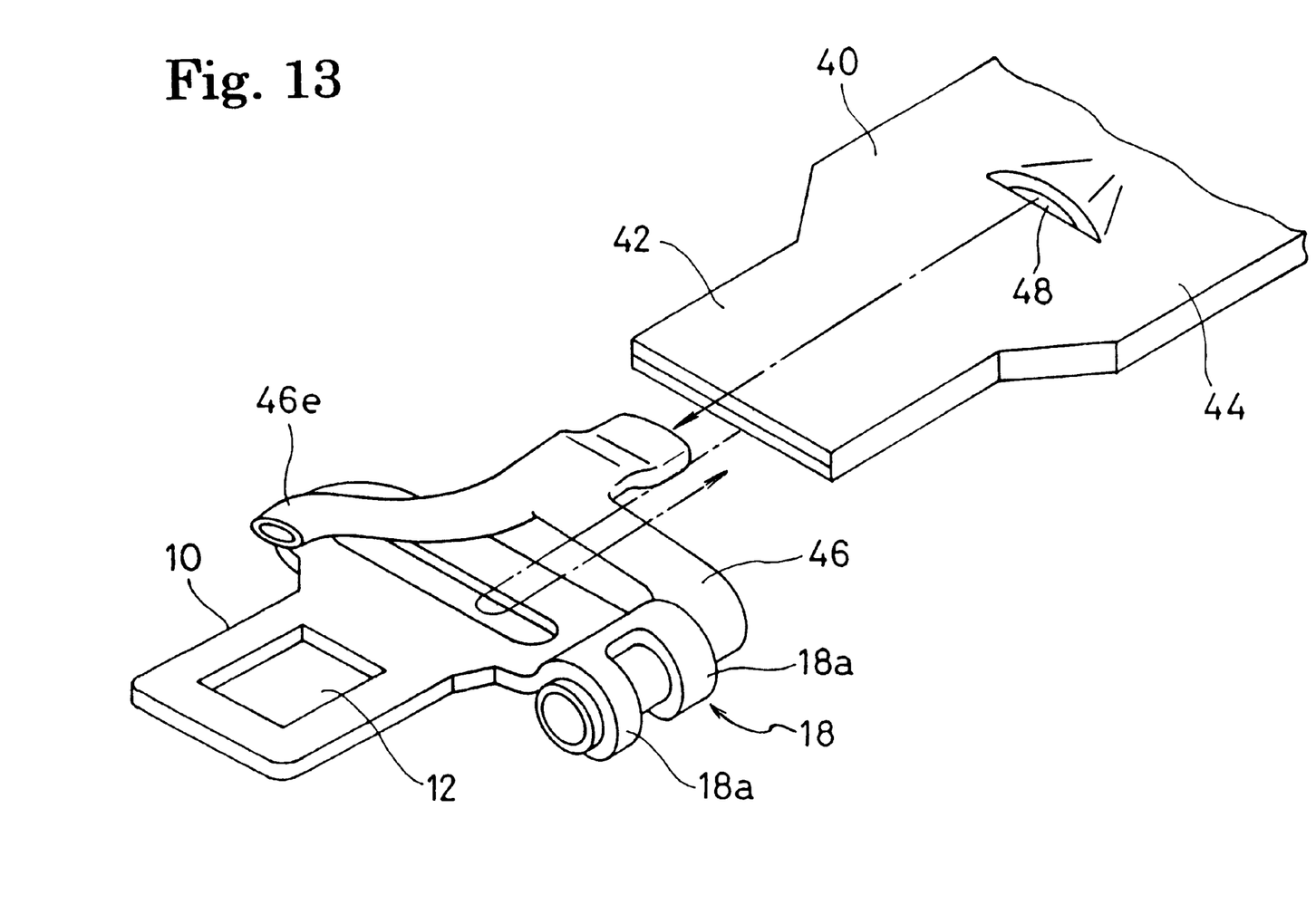
FIG. 13 is an exploded perspective view showing a combination according to another embodiment.

The embodiment shown in FIG. 13 is based on the embodiment of FIGS. 5a through 6. The pipe 46 further includes an exhaust pipe 46e branched from the pipe 46. The other structures of this embodiment are the same as those of the embodiment of FIG. 6 and the same numerals designate the same parts.

When the occupant's body bends over the inflated inflatable belt, gas in the inflatable belt is discharged through the exhaust pipe 16e, 46e, thereby absorbing the impact applied on the occupant.

FIGS. 14a, 14b, 15a and 15b show embodiments in which the gas inlet and the exhaust port of the pipe have caps to prevent foreign objects from entering the gas passages or the inflatable belt.

Figures 14A, 14B:
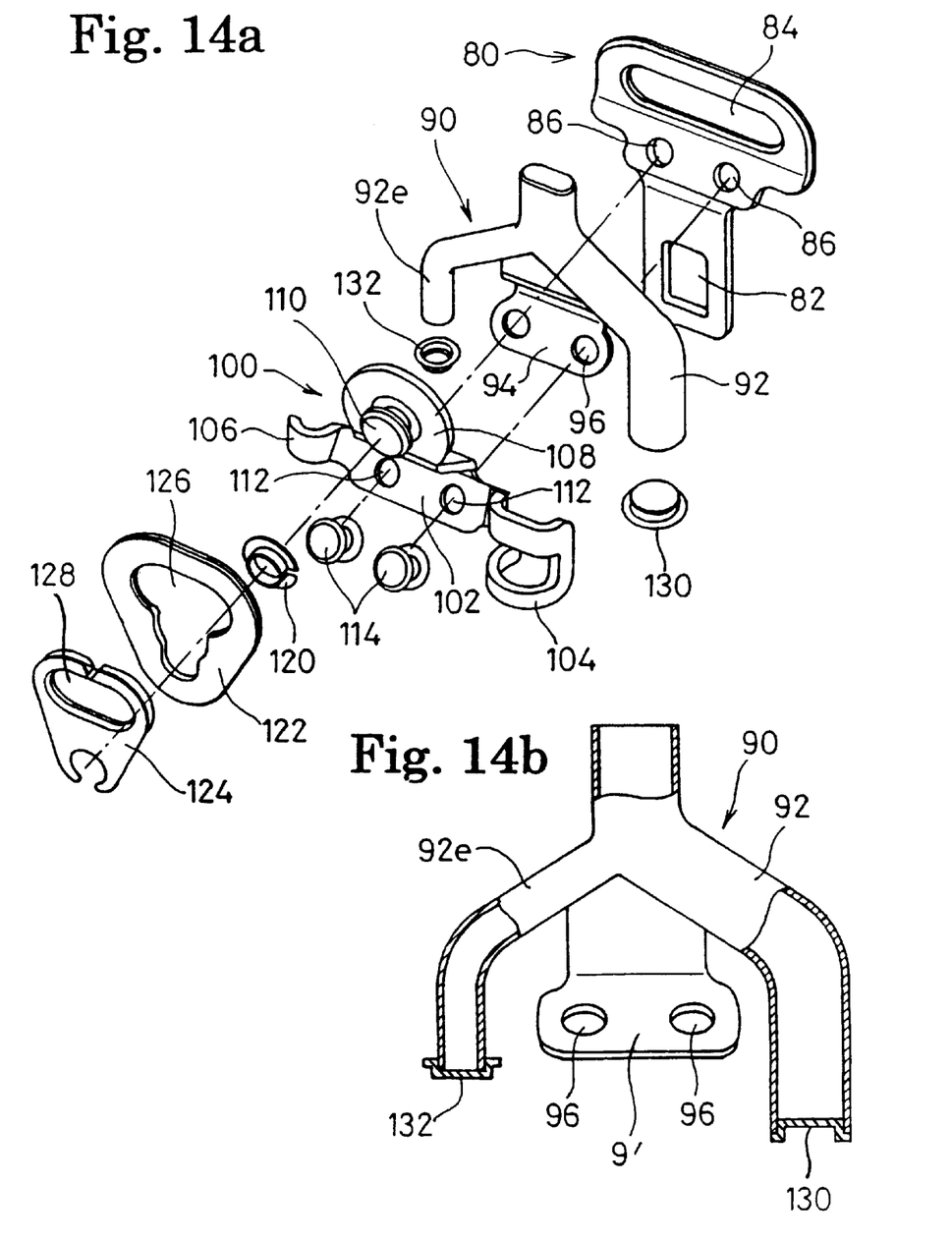

As shown in FIG. 14a, a front end portion of the tongue 80 has a latch hole 82 and a rear end portion of the tongue 80 has an opening 84, which allows the inflatable belt to pass through the tongue 80. Rivet holes 86 are provided in the tongue 80. A pipe assembly is arranged on the tongue 80.

The pipe assembly 90 includes a pipe 92, an exhaust pipe 92e branched from the pipe 92, and an attachment plate 94 preferably integrally formed with the pipes 92, 92e to form a monolithic unit. The attachment plate 94 is provided with rivet holes 96.

A holder assembly is provided on the pipe assembly 90. The holder assembly 100 includes a center plate 102 superposed on the attachment plate 94, a first holder 104 continued from one side of the center plate 102 for supporting the pipe 92, a second holder 106 continued from the other side of the center plate 102 for supporting the exhaust pipe 92e, an anchor mounting plate 108 projecting from the center of the center plate 102, a lap belt anchor 110 disposed on the anchor mounting plate 108, and rivet holes 112 formed in the center plate 102.

The tongue 80, the pipe assembly 90, and the holder assembly 100 are superposed in such a manner that the rivet holes 86, 96, 112 are disposed coaxially and are connected by rivets 114. An anchor plate 122 is fitted onto the lap belt anchor 110 via a slip ring 120 and then an anchor clamp 124 is fitted onto the lap belt anchor 110. The anchor plate 122 and the anchor clamp 124 are provided with belt through openings 126, 128, respectively. An end portion of a lap belt 130 is passed through the openings 126, 128 so as to connect the lap belt 130 to the tongue 80.

As shown in FIGS. 14a, 14b, caps 132, 134 are placed on the ends of the exhaust pipe 92e and the pipe 92, respectively. After that, a cover mold 140 is made, for example, by molding resin around an assembly including the tongue 80 as shown in FIG. 15b.

Figure 15A:
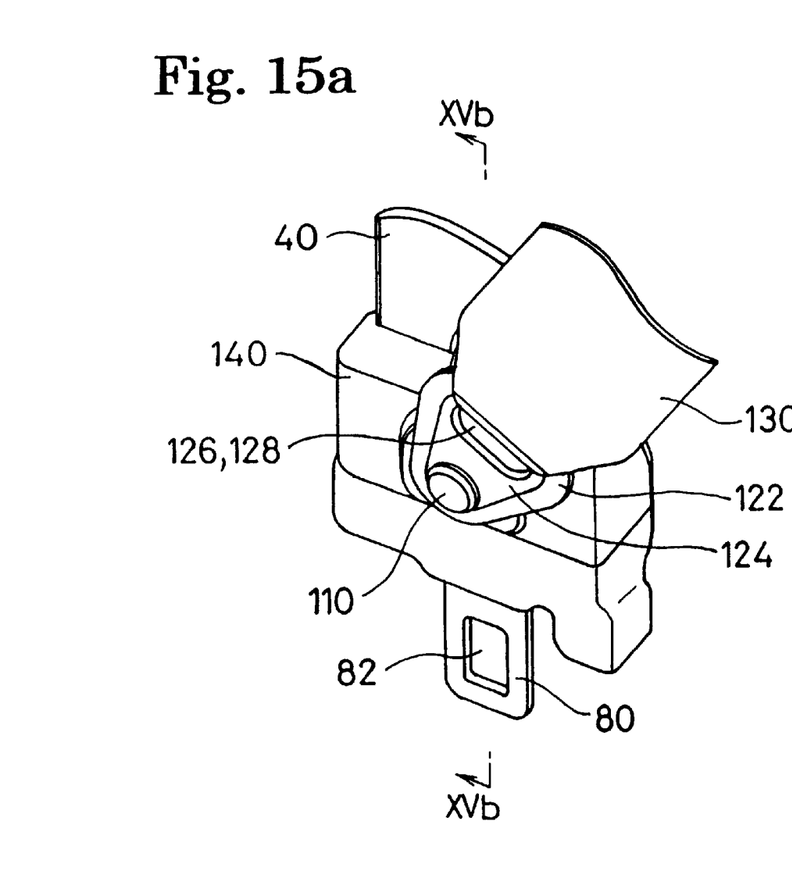
Figure 15B:
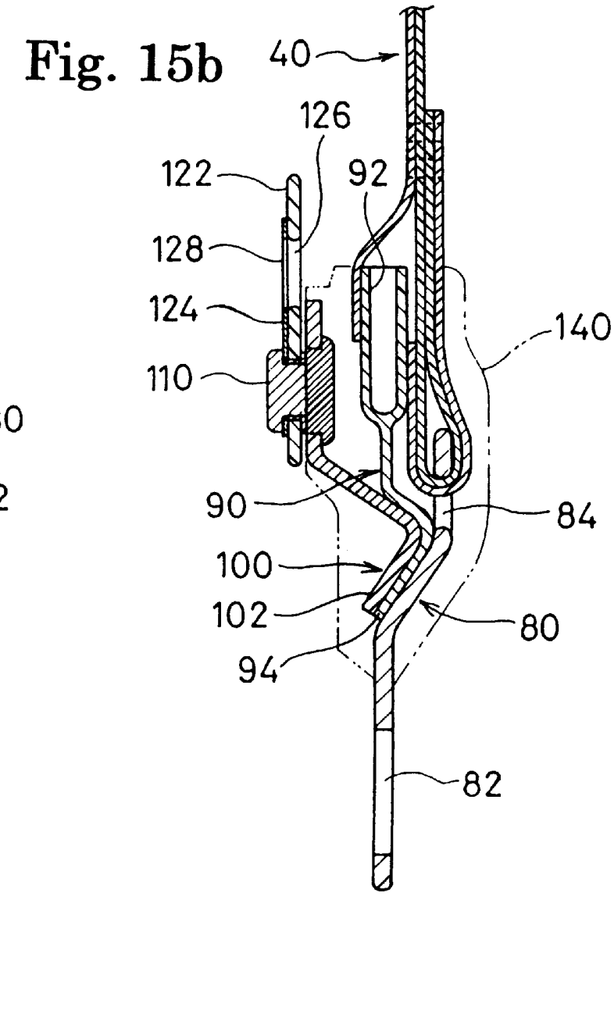

As apparent from FIGS. 14b and 15a, the end portion of the pipe 92 extends longer than the end portion of the exhaust pipe 92e, thus ensuring the correct insertion of the tongue 80 into the buckle. That is, a gas discharge port at the end of buckle is formed concavely so that the gas discharge port confronts the end of the pipe 92 without fail. The buckle has a nozzle which can project from the gas discharge port by gas pressure. When gas is spouted out, the cap 134 is broken by the nozzle, thus allowing gas to be introduced into the pipe 90. It should be understood that the nozzle can be omitted and the cap 134 may be broken by the gas pressure.

Though the cap 132 of the exhaust pipe 92e is preferably structured to be broken by exhaust gas pressure, the cap 132 may be structured to open like a door from the end of the discharge pipe 92e or to separate from the end of the discharge pipe 92e.

As described above, according to the present invention, the connecting portion of the inflatable belt and the tongue can have a small thickness. The tongue thus projects less when it is hanging from the center pillar, thereby improving the beauty of the vehicle cabin.

Additional modifications and advantages may readily appear to one skilled in the art. The invention, therefore, is not limited in to the specific details set forth herein. Accordingly, various modifications may be made without departing from the spirit or scope of the invention as defined by the appended claims and their equivalents.

Priority document, Japanese Patent Application, H10-190528, filed Jul. 6, 1998, is hereby incorporated by reference.

What is claimed is:

1. A safety belt for a motor vehicle comprising:

a tongue including an opening at a rear portion;

an inflatable belt having a main portion and an end portion, the belt being connected to the rear portion of the tongue and into which a gas is introduced; and a gas introduction pipe connected to the tongue, wherein a rear end portion of the gas introduction pipe is disposed inside the inflatable belt and a front end portion is disposed outside of the inflatable belt; and wherein the end portion of the inflatable belt passes through the opening and is folded back at the opening to be superposed onto the main portion of the inflatable belt, the superposed portions of the inflatable belt being connected together.

2. A safety belt as claimed in claim 1, wherein the superposed portions are connected to each other by sewing.

3. A safety belt as claimed in claim 1, wherein the tongue further includes a pipe holder and the gas introduction pipe is held by the pipe holder.

4. A safety belt as claimed in claim 3, wherein the pipe holder clamps the gas introduction pipe.

5. A safety belt as claimed in claim 1, wherein the gas introduction pipe is formed with an attachment plate in a monolithic unit and the attachment plate is fixed to the tongue.

6. A safety belt as claimed in claim 5, further comprising a holder assembly connected to the tongue, wherein the holder assembly includes a lap belt anchor, the gas introduction pipe, and the attachment plate.

7. A safety belt as claimed in claim 1, further comprising a closing element for closing an inlet port of the gas introduction pipe.

8. A safety belt as claimed in claim 1, wherein the gas introduction pipe extends along a side of the tongue to the rear of the tongue.

9. A safety belt as claimed in claim 1, further comprising an exhaust pipe for discharging gas from the inflatable belt.

10. A safety belt as claimed in claim 9, wherein the exhaust pipe branches from the gas introduction pipe.

11. A safety belt as claimed in claim 9, further comprising a closing element for closing an end of the exhaust pipe.

12. A safety belt as claimed in claim 11, wherein the closing element is a cap.

13. A safety belt as claimed in claim 1, wherein the inflatable belt includes a bag and a cover enclosing the bag.

14. An inflatable belt device comprising:
 a safety belt including
  a tongue including an opening at a rear portion;
  an inflatable belt having a main portion and an end portion, the belt being connected to the rear portion of the tongue and into which a gas is introduced; and
  a gas introduction pipe connected to the tongue;
 a buckle engageable with the tongue; and
 a gas supply source disposed on the buckle for supplying gas into the gas introduction pipe;
 wherein a rear end portion of the gas introduction pipe is disposed inside the inflatable belt and a front end portion is disposed outside of the inflatable belt; and
 wherein the end portion of the inflatable belt passes through the opening and is folded back at the opening to be superposed onto the main portion of the inflatable belt, the superposed portions of the inflatable belt being connected together.

15. A safety belt for a motor vehicle comprising:
 a tongue including an opening at a rear portion;
 an inflatable belt connected to the rear portion of the tongue and into which a gas is introduced;
 a gas introduction pipe connected to the tongue;
 a closing element for closing an inlet port of the gas introduction pipe; and
 wherein a rear end portion of the gas introduction pipe is disposed inside the inflatable belt and a front end portion is disposed outside of the inflatable belt.

16. A safety belt as claimed in claim 15, further comprising an exhaust pipe for discharging gas from the inflatable belt.

17. A safety belt as claimed in claim 16, wherein the exhaust pipe branches from the gas introduction pipe.

18. A safety belt as claimed in claim 16, further comprising a closing element for closing an end of the exhaust pipe.

19. A safety belt as claimed in claim 18, wherein the closing element is a cap.

20. The safety belt of claim 1, wherein the inflatable belt includes a wide portion and a narrow portion adjacent the opening.

21. The safety belt of claim 20, wherein the gas introduction pipe is disposed inside the wide portion of the inflatable belt.

22. The safety belt of claim 1, further comprising a cover enclosing the rear portion of the tongue and the end of the inflatable belt.

23. The safety belt of claim 22, wherein the cover comprises synthetic resin.

* * * * *